Jan. 17, 1939.　　　D. K. PILKINGTON　　　2,144,028
POWER TRANSMITTING DEVICE
Filed April 17, 1936
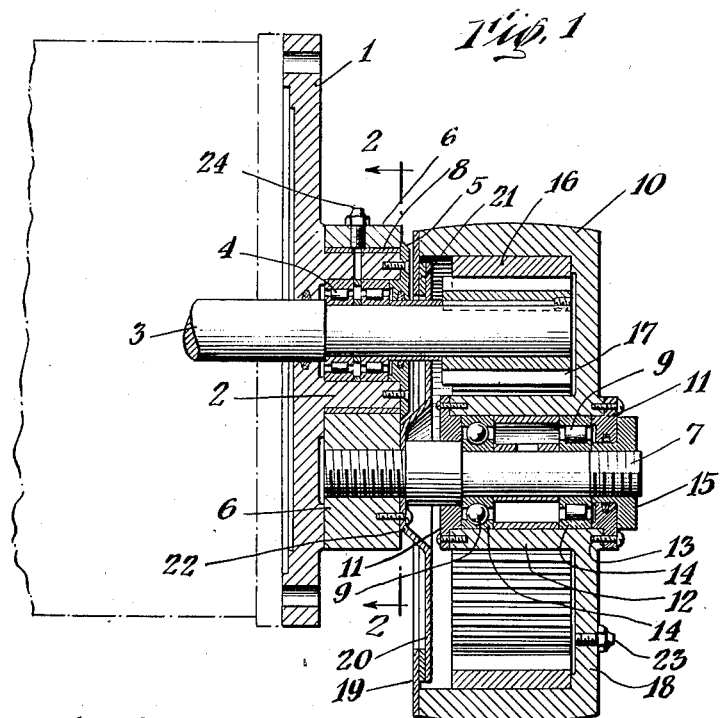
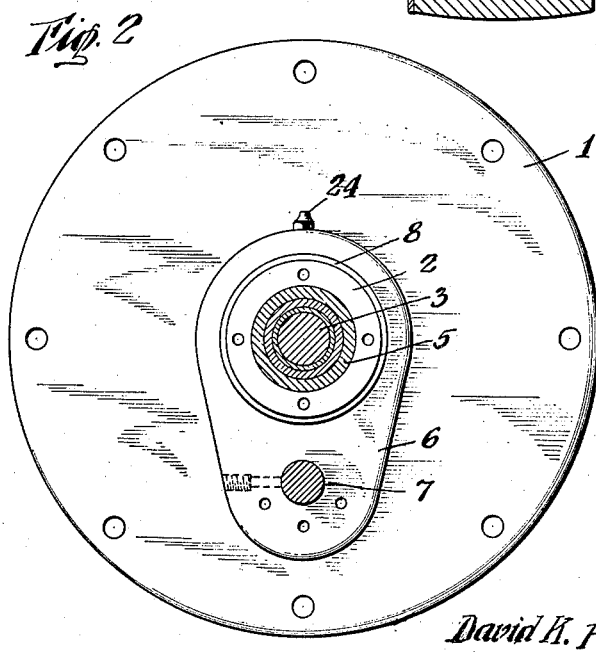
INVENTOR
David K. Pilkington
BY
Austin & Dix
ATTORNEYS Patented Jan. 17, 1939

2,144,028

UNITED STATES PATENT OFFICE 2,144,028

POWER TRANSMITTING DEVICE

David K. Pilkington, Sunbury-on-Thames, England, assignor, by mesne assignments, to Richard Lewis Woodhouse, Melbourne, Victoria, Australia Application April 17, 1936, Serial No. 74,855
In Great Britain May 9, 1935

1 Claim. (Cl. 74—242.15)

This invention relates to power transmitting devices and, more particularly, to belt drives of the type wherein a belt pulley is geared to a power transmitting shaft in such a way that the pulley is capable of swinging about the shaft to tension automatically the belt passing over the pulley.

Among the features of the invention is the provision of a power transmitting device of this character adapted to transmit the drive from an electric motor or other device to another machine or unit, in which device the pulley shaft is carried by a floating plate, which is mounted to swing on a journal or boss co-axial with the motor shaft and provided on an end plate for the motor, said floating plate bearing against said end plate for the motor, so that diversion of the pulley shaft from its true axis, due to overhang of the pulley, is avoided.

Another feature of the invention is to provide a co-operating plate and ring with a sealing element between them, for sealing the pulley against leakage of lubricant, and so enabling it to serve as a lubricant container.

The invention comprises the combinations of elements, features of construction and arrangement of parts having the general mode of operation substantially as hereinafter described and defined in the appended claim.

Various other features and advantages of the invention will be apparent from the following particular description and from an inspection of the accompanying drawing.

Although the novel features which are believed to be characteristic of this invention will be particularly pointed out in the claim appended hereto, the invention itself, as to its objects and advantages, and the manner in which it may be carried out, may be better understood by referring to the following description taken in connection with the accompanying drawing forming a part thereof, in which:

Fig. 1 is a view showing a longitudinal section through the device, and

Fig. 2 is a view showing a section taken along lines 2—2 of Fig. 1 illustrating the construction of the supporting plate for the pulley shaft.

In the following description and in the claim, various details will be identified by specific names for convenience, but they are intended to be as generic in their application as the art will permit. Like reference characters denote like parts in the several figures of the drawing.

In the description of the invention and in the drawing accompanying and forming part of this specification, certain specific disclosure of the invention is made for purposes of explanation, but it will be understood that the details may be modified in various respects without departure from the broad aspect of the invention.

In the example illustrated, an end plate 1 for a driving motor or other device is formed with a circular hollow boss 2 having a concentric relation to the axis of a motor shaft 3 or other shaft projecting through the plate 1.

The boss 2 carries interiorly a roller bearing 4 for the motor shaft 3, the bearing being closed in by an end cap 5; the bearing may be of the ball type if desired.

Mounted to swing on the hollow boss 2 is a plate 6 for supporting a pulley shaft 7, which plate 6 may be substantially pear-shaped and may depend from the boss 2 and bear against the end plate 1 of the motor. A bushing of gun metal 8 preferably is interposed between the plate 6 and the hollow boss 2.

The pulley shaft 7 is fixed in the plate 6 below the motor shaft 3, so that the two shafts are in parallel relation. The pulley shaft 7 is non-rotatable in the plate 6 and carries a ball or roller bearings 9 on which the pulley 10 is mounted to rotate freely. The ends of the bearings 9 may be closed by end caps 11 which are fixed to the pulley hub 12, one at each end, and have circumferential shoulders 13, which enter the ends of the hub 12 adjacent to the movable races 14 of the bearings 9, and so position the pulley 10 on the bearings 9. A collar 15 may be screwed or otherwise fixed on the pulley shaft 7 beyond the outer end cap 11 to secure the pulley 10 in the shaft 7.

An internally toothed ring 16 or annular gear is fitted in the pulley 10, around the inner circumference thereof. The teeth may, however, be formed integrally with the pulley. The driving shaft 3 of the motor extends into the pulley 10 and has keyed thereon a toothed pinion 17 which meshes with the annular gear 16 in the pulley 10. The outer end of the pulley is closed by a web 18. A ring 19 of metal or other material is fixed to the inner end of the pulley 10, so as to form an inwardly directed lip. A circular plate 20 of metal or other rigid material provided with a circumferential sealing ring 21 of felt or the like closes the inner open end of the pulley, the felt or like ring 21 bearing against the lip formed by the metal ring 19 attached to the pulley 10. This circular sealing plate 20 is pressed out at the centre to form a boss 22 in which an opening is made for the passage of the pulley shaft 7, the boss 22 being fixed to the swinging plate 6 which carries the pulley shaft 7. The pulley 10 thus forms a closed container for lubricant, which may be supplied through a nipple 23 fitted in the pulley web 18.

Lubricating nipples may be fitted to other parts of the device, where required; for instance, the nipple 24 is provided in the bearing portion of the swinging plate 6, which carries the pulley shaft 7.

In operation, when the motor is started, the plate 6 carrying the pulley shaft 7 swings about the hollow boss 2 on the motor end plate 1, thereby tightening the power transmitting belt (not shown) which passes around the pulley 10, and so effecting normal transmission of power, the belt being tensioned automatically to suit the load under running conditions.

From the foregoing, it will be seen that the invention provides a device which can be easily manufactured and assembled and attached to a housing for a motor or other apparatus having a shaft to be connected to the pulley. The pulley is so formed as to provide a convenient lubricant container and the mounting arrangement effectively maintains the proper relations between the pulley shaft and connected shaft.

While certain novel features of the invention have been disclosed and are pointed out in the annexed claim, it will be understood that various omissions, substitutions and changes may be made by those skilled in the art without departing from the spirit of the invention.

What I claim is:

In an automatic belt tightening device, a stationary support having a shaft passing therethrough and having a projecting boss surrounding said shaft, said support having a flat bearing surface adjacent said boss, a freely swingable arm journalled around said boss, the free end of said arm having free sliding engagement with said flat bearing surface, the free end of said arm having a socket, a pulley shaft fixedly mounted in said socket parallel to said first shaft, a pinion on said first shaft, a pulley having a side plate, an annular belt-supporting flange and an annular hub flange, an anti-friction bearing between said hub flange and said pulley shaft, an internal gear secured to said pulley between said annular flanges and meshing with said pinion, a sealing plate having a hub portion surrounding said pulley shaft and fixedly connected to the free end of said arm and having an opening for said first shaft, said sealing plate having sealing engagement with the inner end of said belt-supporting flange and forming with said pulley a lubricating housing, said arm freely swinging about said boss automatically to tension the belt in accordance with load torque.

DAVID K. PILKINGTON.